US008184512B2

(12) United States Patent
Gagneraud et al.

(10) Patent No.: US 8,184,512 B2
(45) Date of Patent: May 22, 2012

(54) OPTICAL DISK DRIVE WITH EMBEDDED TEST MEDIUM

(75) Inventors: Eric Gagneraud, Houston, TX (US); Clyde L. Gazaway, Tomball, TX (US); Daniel Robert Oswalt, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2 days.

(21) Appl. No.: 12/903,817

(22) Filed: Oct. 13, 2010

(65) Prior Publication Data

US 2012/0092978 A1 Apr. 19, 2012

(51) Int. Cl.
*G11B 7/00* (2006.01)
(52) U.S. Cl. ..................................... 369/53.1
(58) Field of Classification Search ............... 369/71, 369/53.42, 53.19, 47.51, 44.32, 53.32, 53.22, 369/53.1
See application file for complete search history.

(56) References Cited

U.S. PATENT DOCUMENTS

| 5,088,082 | A  | * | 2/1992  | Yamada et al. ............. 369/71     |
| 7,233,555 | B2 | * | 6/2007  | Ho et al. ................... 369/53.19 |
| 7,304,816 | B2 |   | 12/2007 | Johnson et al.                         |
| 7,843,783 | B2 | * | 11/2010 | Liu et al. ................... 369/47.51 |
| 8,009,539 | B2 | * | 8/2011  | Haustein et al. ........... 369/53.42   |
| 8,054,716 | B2 | * | 11/2011 | Inoue ......................... 369/44.32 |
| 2009/0128142 | A1 |  | 5/2009  | Deng et al.                            |
| 2009/0285072 | A1 |  | 11/2009 | Bakx et al.                            |

FOREIGN PATENT DOCUMENTS

| JP | 2004039191 A | 2/2004 |
| KR | 100251929 B1 | 4/2000 |
| KR | 2004006052 A | 7/2004 |

\* cited by examiner

*Primary Examiner* — Nabil Hindi

(57) ABSTRACT

Embodiments provide an optical disk drive that includes an embedded test medium for testing the optical performance of an optical head in the optical disk drive.

20 Claims, 7 Drawing Sheets

200

300

300

600

700

OPTICAL DISK DRIVE WITH EMBEDDED TEST MEDIUM

BACKGROUND

An optical disk drive is an electronic device that uses electromagnetic waves close to the visible light spectrum to either store data to or read data from an optical storage medium. Optical disk drives are used in numerous commercial and consumer devices, including, for example, compact disk (CD) systems, digital versatile disk (DVD) systems, and numerous other systems. These systems may be stand alone, or may be incorporated into another system, such as a desktop computer or laptop computer. In order to read or write data, the optical drive uses a laser to generate a light beam, a lens to guide the light beam to a precise area of the optical disk to read or write data, and a photodiode to detect light reflected from the disk when reading data. However, for various reasons, optical disk drives may fail to read and write data.

BRIEF DESCRIPTION OF THE DRAWINGS

Certain exemplary embodiments are described in the following detailed description and in reference to the drawings, in which.

DETAILED DESCRIPTION

An embodiment described herein provides an embedded test medium that may be used to test an optical system in an optical drive. The embedded test medium may include zones for testing reading, writing, or both. Further, zones for testing different functionality, such as reading at different wavelengths of light, may be included.

Figure 1:
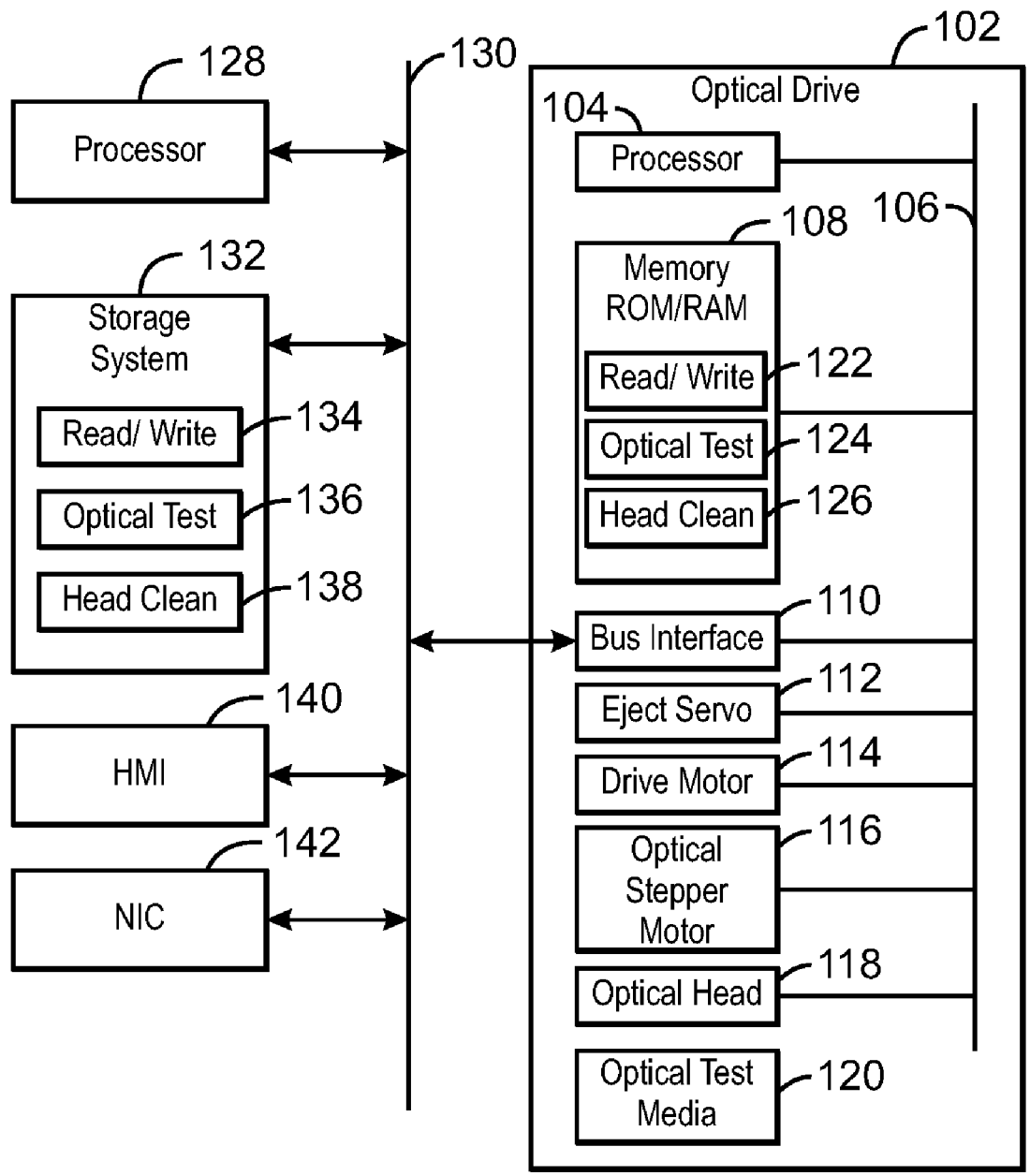
FIG. 1 is a block diagram of a computer system, showing an optical drive, in accordance with an embodiment.

FIG. 1 is a block diagram of a computer system 100, showing an optical drive 102, in accordance with an embodiment. The optical drive 102 may be a compact disk (CD) drive, a digital versatile disk (DVD) drive, a Blu-Ray drive, a multi-function drive, a CD read-only memory (ROM) drive, a DVD ROM, and the like. The optical drive 102 may have a processor 104 in communication with other units through an internal bus 106. The processor 104 may be a microcomputer, an application specific integrated circuit, or any number of other control units. A storage device 108, such as a read only memory (ROM) or a random access memory (RAM), can provide operational code for directing the processor 104 to control the optical drive 102. A bus interface 110 can be used to communicate with other units in the computer system 100.

Various units in the optical drive 102 are used by the processor 104 to access an optical disk. For example, pressing a button may direct the processor 104 to activate an ejection servomotor 112, which may open a tray for insertion of an optical disk. Pushing on the tray, or pressing a button, may direct the processor 104 to activate the ejection servomotor 112 to close the tray. A drive motor 114 may be activated by the processor 104 after the tray is closed, spinning the optical disk up to speed. An optical stepper motor 116 can be used by the processor 104 to may an optical head 118 across the surface of the optical disk, reading or writing information to the drive. The optical head 118 may become contaminated with dust, oil, or other materials over time, interfering with the transmission of light to and from the optical disk. This may lower the efficiency of the reading or writing processes, leading to errors.

In an embodiment, an optical test medium 120 may be placed in the path of the optical head 118, for example, by extending the travel of the optical head 118 beyond the general radius of an optical disk. As discussed in further detail herein, the optical test medium 120 may contain one or more test zones, which can be configured to allow testing of reading by the optical head 118 using one or more optical technologies. Further, a test zone may be included in the optical test medium 120 that can allow the testing of write capabilities using one or more optical technologies.

The storage system 108 may contain code modules, for example, a read/write module 122 can direct the processor 104 to read data from or write data to an optical disk. If errors are noted, or on a predetermined schedule, an optical test module 124 may direct the processor 104 to move the optical head 118 the optical test medium 120 and run functional tests on the optical head 118. The functional tests may include, for example, reading from a first zone, writing to a second zone, or combinations thereof. If the optical test module 124 determines that there is a problem with the optical head 118, in some embodiments, a head cleaning module 126 may be activated. The head cleaning module 126 may attempt to remove contaminates from the optical head 118, for example, by directing the processor 104 to use the optical stepper motor 116 to vibrate the optical head 118 and dislodge any contaminates. Other vibration or cleaning technologies may be used in various embodiments, including, for example, moving the optical head 118 over a cleaning brush or using a separate transducer to vibrate the optical head 118.

In an embodiment, the optical drive 102 may be installed as part of the computer system 100, for example, in a laptop computer, a desktop computer, or a server system. In other embodiments, the optical drive 102 may be a separate, standalone unit that is coupled to the computer system 100 by an external interface, such as a CD player, a DVD player, an external optical drive, or an optical drive cluster. In an embodiment, the computer system 100 will generally have a processor 128 coupled to a bus 130 for communications with functional units, such as the optical drive 102. The processor 128 for the computer system 100 may be a single core processor, a multi-core processor, or a computing cluster, for example, in a cloud computing arrangement. The bus 130 may include, for example, an ISA bus, an EISA bus, a PCI bus, a PCIe bus, or any number of other bus or communications technologies.

A storage system 132 may be coupled to the bus 130 to provide operational code and storage to the processor 128. The storage system 132 may include any combinations of random access memory (RAM), read only memory (ROM), hard drives, optical drives, RAM drives, flash drives, and the like. In an embodiment, the storage system 132 may include code modules configured to provide functionality to an optical drive 102, for example, by being downloaded to a memory 108 in the optical drive 102. For example, the storage system 132 may include a read/write module 134, such as discussed with respect to block 122. Further, the storage system 132 may hold an optical test module 136, as discussed with respect to block 124, or a head cleaning module 138, as discussed with respect to block 126. In an embodiment, these modules 134, 136, and 138, may be run by the processor 128 on the computer system 100, itself, or may be downloaded to the optical drive 102 for execution by the processor 104 on the optical drive 102. Embodiments are not limited to the download, as the memory 108 may be a ROM or flash drive containing the modules.

The computer system 100 may also have other units to provide functionality. Such units may include a human machine interface (HMI) 140, which may be used to couple the computer system 100 to a mouse or keyboard, or a touch screen system, which may be used to get input from a user directly touching a screen. A network interface card (NIC) 142 may be used to link the computer system 100 to networks. Embodiments are not limited to an integrated optical drive 102. As discussed with respect to FIG. 2, an embodiment may include an external optical drive or player.

Figure 2:
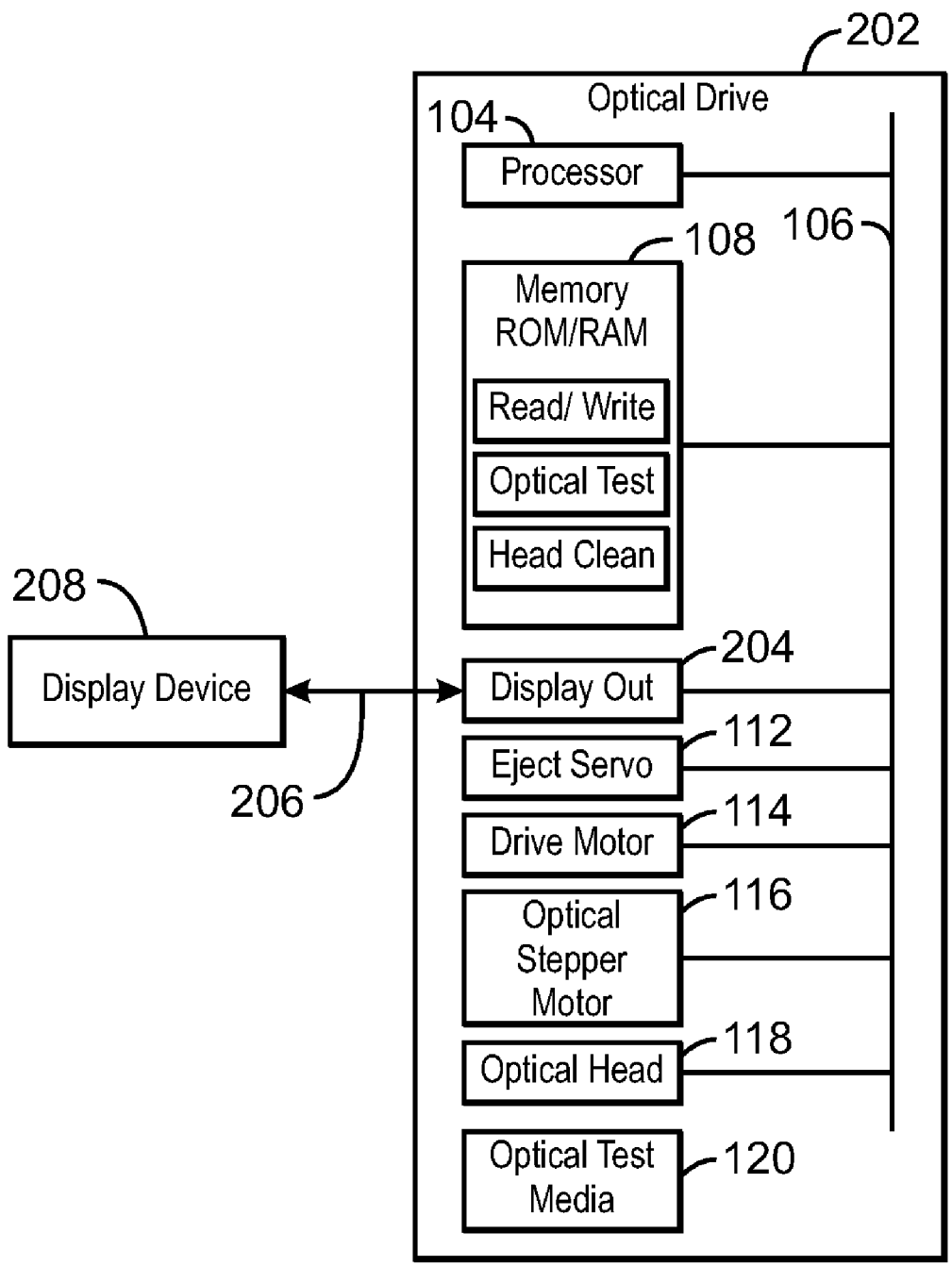
FIG. 2 is a block diagram of an external optical drive, in accordance with an embodiment.

FIG. 2 is a block diagram of an external optical drive 202, in accordance with an embodiment. The external optical drive 202 may include, for example, a CD player, a DVD player, or a Blu-Ray player, among others. Like numbered units are as described with respect to FIG. 1. The optical drive 202 may include a display interface 204 to provide a video signal 206 to a display device 208. The display interface 204 may include a video interface, such as a High-Definition Multimedia Interface (HDMI), or a digital video interface (DVI), among many others. The display interface 204 may also be an analog interface, such as a standard video interface, S-video, or component video. The display device 208 may be, for example, a television or monitor.

Figure 3A:
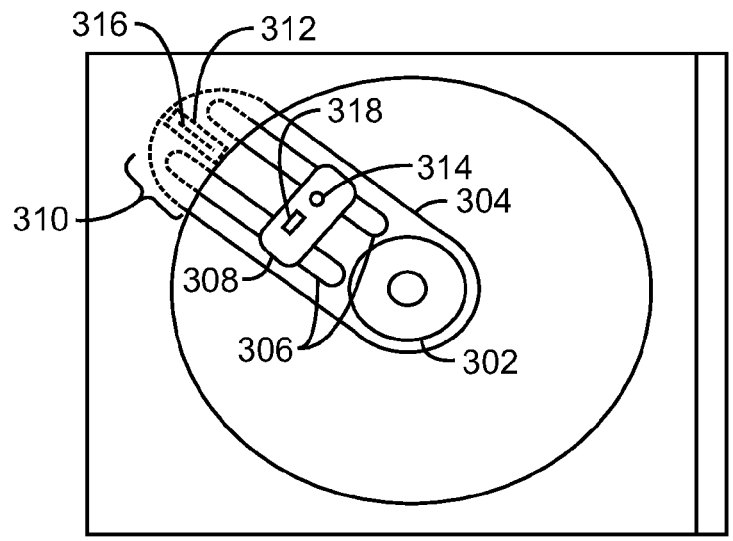
FIG. 3A is a top view of a tray in an optical drive, in accordance with an embodiment.

FIG. 3A is a top view of a tray 300 in an optical drive, in accordance with an embodiment. The tray 300 shows the spindle 302 used to hold and spin an optical disk. A recessed region 304, which may be located below the plane of an optical disk, holds the mechanism for reading the optical disk. In the recessed region 304, rails 306 may be used to guide the optical head 308 along a fixed path. The optical head 308 may be moved by an optical stepper motor, for example, the optical stepper motor 116 described with respect to FIG. 1. In an embodiment, the rails 306 may extend under an outer portion 310 of the tray 300, for example, outside of the radius of an optical disk, allowing the optical head 308 to access an optical test medium 312. The optical test medium 312 can be oriented so that a laser 314 on the optical head 308 will strike a test zone 316 on the optical test medium 312 and be reflected back to a detector 318 on the optical head 308.

Figure 3B:
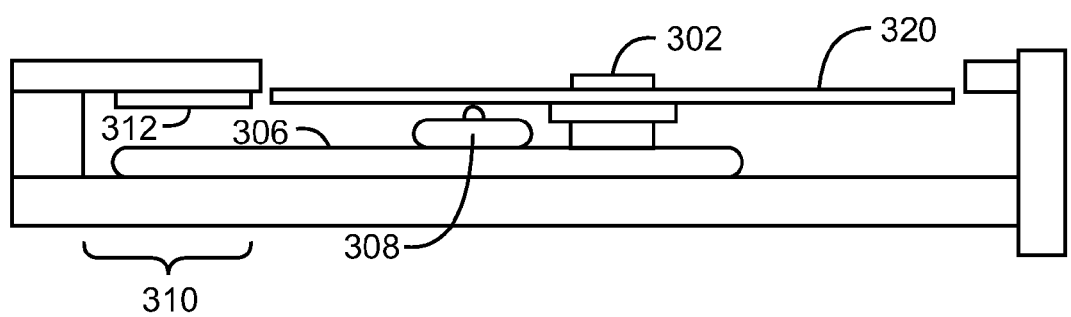
FIG. 3B is a side view of the tray, showing the embedded optical test medium, in accordance with an embodiment.

FIG. 3B is a side view of the tray 300, showing the embedded optical test medium 312, in accordance with an embodiment. In this view, like numbered units are as explained with respect to FIG. 2. An optical disk 320 is shown on the spindle 302. As can be seen in this view, the optical head 308 may pass from under the optical disk 320 to under the optical test medium 312.

Figure 4A:
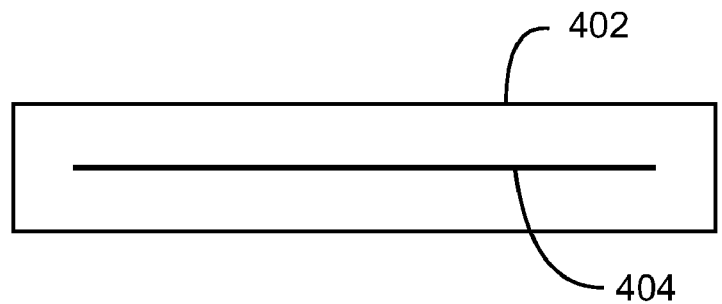
FIG. 4A is a drawing of an optical test medium, in accordance with an embodiment.

FIG. 4A is a drawing of an optical test medium 400, in accordance with an embodiment. The optical test medium 400 has a base 402, for example, made from a transparent material such as polycarbonate, polyacrylate, quartz, glass, and the like. In an embodiment, a test zone comprising an optically active feature 404, such as a reflective groove, may be embedded in the base 402. In other embodiments, the optically active feature 404 may be formed on the surface of the base 402. Further, embodiments are not limited to this combination of materials or arrangements, as any optically active feature 400 that allows a light to be focused from the laser, reflected, and returned to a detector may be used.

Figure 4B:
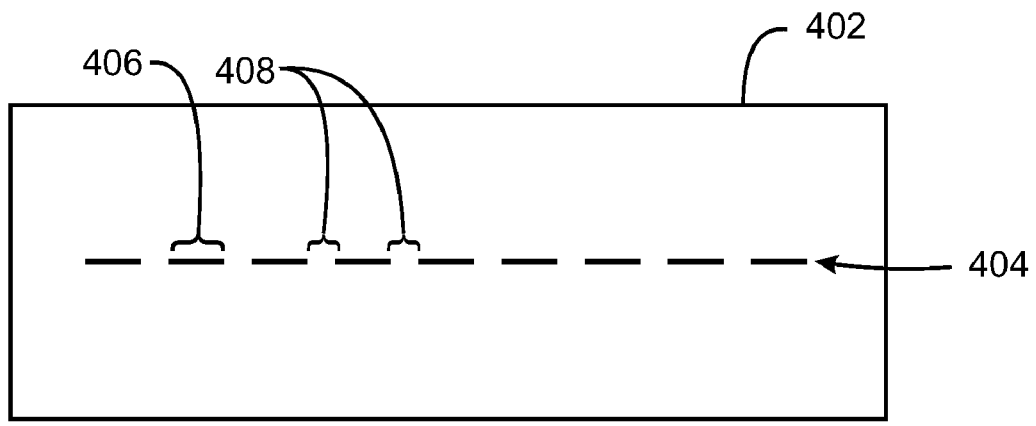
FIG. 4B is a magnified view of the optically active feature, in accordance with an embodiment.

FIG. 4B is a magnified view of the optically active feature 404, in accordance with an embodiment. As optical disks may often use changes from a groove to a land, or flat region, to encode bits, the optically active feature 404 may include a number of grooves 406 separated by flat regions 408. The transitions 410 from groove 406 to flat region 408, and vice versa, may encode a test sequence. The sequence shown is merely presented as an example, as no particular test sequence is required. Further, the optical test medium may hold multiple test zones, as discussed further with respect to FIG. 5.

Figure 5:
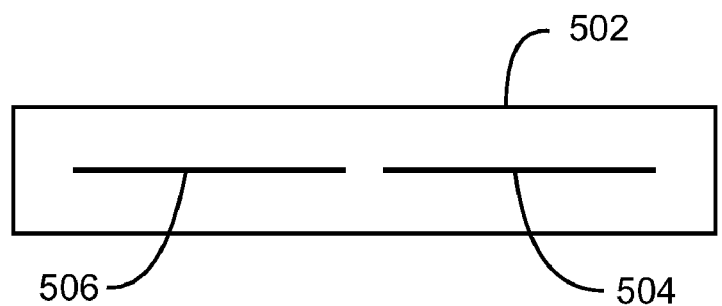
FIG. 5 is a drawing of an embedded test medium showing two test zones, in accordance with an embodiment.

FIG. 5 is a drawing of an embedded test medium 500 showing two test zones, in accordance with an embodiment. The base 502 for the embedded test medium 500 may be made from the same materials as discussed with respect to FIG. 4. In some embodiments, multiple test zones may be used to test different functions of an optical head. For example, a first test zone 504 may be designed to test the performance of optics functioning at a near-red wavelength, such as about 780 nm for a CD drive, or about 650 nm for a DVD drive. A second test zone 506 may be used to test the performance of optics functioning at a near-blue wavelength, such as about 405 nm for a Blu-Ray drive.

Further, one of the test zones 504 or 506 may be configured to test writing performance of a drive. During a write test, bits may be written to a writeable material in a test zone and, then, read back from the test zone using the optical head. Since the material may be a write once material, in an embodiment, one or more bits may be written to the test zone every few weeks, every month, or every year. The write interval may be set depending on the expected lifespan of the optical drive. In an embodiment, writing may be tested after a problem is detected, for example, during a read test. The embedded test medium 500 is not limited to two zones, but may include any number of zones that could be used to test the drive functions present, as discussed further with respect to FIG. 6.

Figure 6:
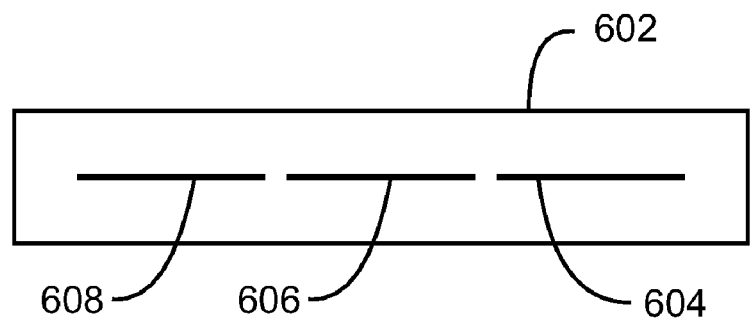
FIG. 6 is a drawing of an embedded test medium showing multiple test zones, in accordance with an embodiment.

FIG. 6 is a drawing of an embedded test medium 600 showing multiple test zones, in accordance with an embodiment. The base 602 is as discussed with respect to FIG. 4. The embedded test medium 600 may, for example, have three zones. A first zone 604 may be used to test the read performance of an optical head at a near-red wavelength, while a second zone 606 may be used to test the read performance of an optical head at a near-blue wavelength. A third zone 608, made from a write once material, may be used to test the write performance of the optical head, for example, at either of the two wavelengths. It will be clear that further zones may be included to test the performance of other systems, such as an addition writing zone configured to test writing performance at the other wavelength.

The number of test zones may be set by the amount of space each zone needs. Reading a test zone is performed by moving the head along the test zone, using the rails. By comparison, when reading from an optical disk, the head reads from a long spiral track and, thus, the test zone holds a relatively small amount of space, for example, enough for about 500 bits, about 1000 bits, or about 2000 bits.

If the optical testing identifies a problem with the reading or writing performance, it may be reported to a user, for example, by an alert window. Further, in an embodiment, an automated cleaning sequence may be activated to clean the heads, as discussed with respect to FIG. 7.

Figure 7:
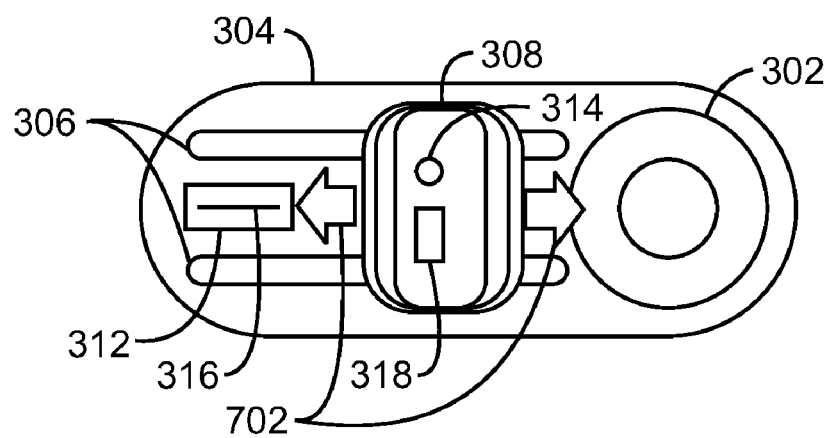
FIG. 7 is a drawing of an automated cleaning sequence of the optical heads, in accordance with an embodiment.

FIG. 7 is a drawing of an automated cleaning sequence 700 of the optical heads, in accordance with an embodiment. In FIG. 7, like numbered elements are as described with respect to previous figures. In the automated cleaning sequence 700, the optical head 308 may be moved quickly back and forth by the optical stepper motor, causing vibrations 702. The vibrations 702 may dislodge dust, oil, or other contaminants on the laser 316 or the detector 318. Embodiments are not limited to the use of vibrations 702 caused by the optical stepper motor, but may use any number of other techniques to clean the optical head 308. For example, a brush may be positioned, for example, along the rails 306 past the embedded test medium 312. In this embodiment, the optical head 308 may be moved under the brush to remove any contaminants. In an embodiment, an external unit, such as an ultrasonic transducer, may be used to induce vibrations in the head and dislodge contaminants.

Figure 8:
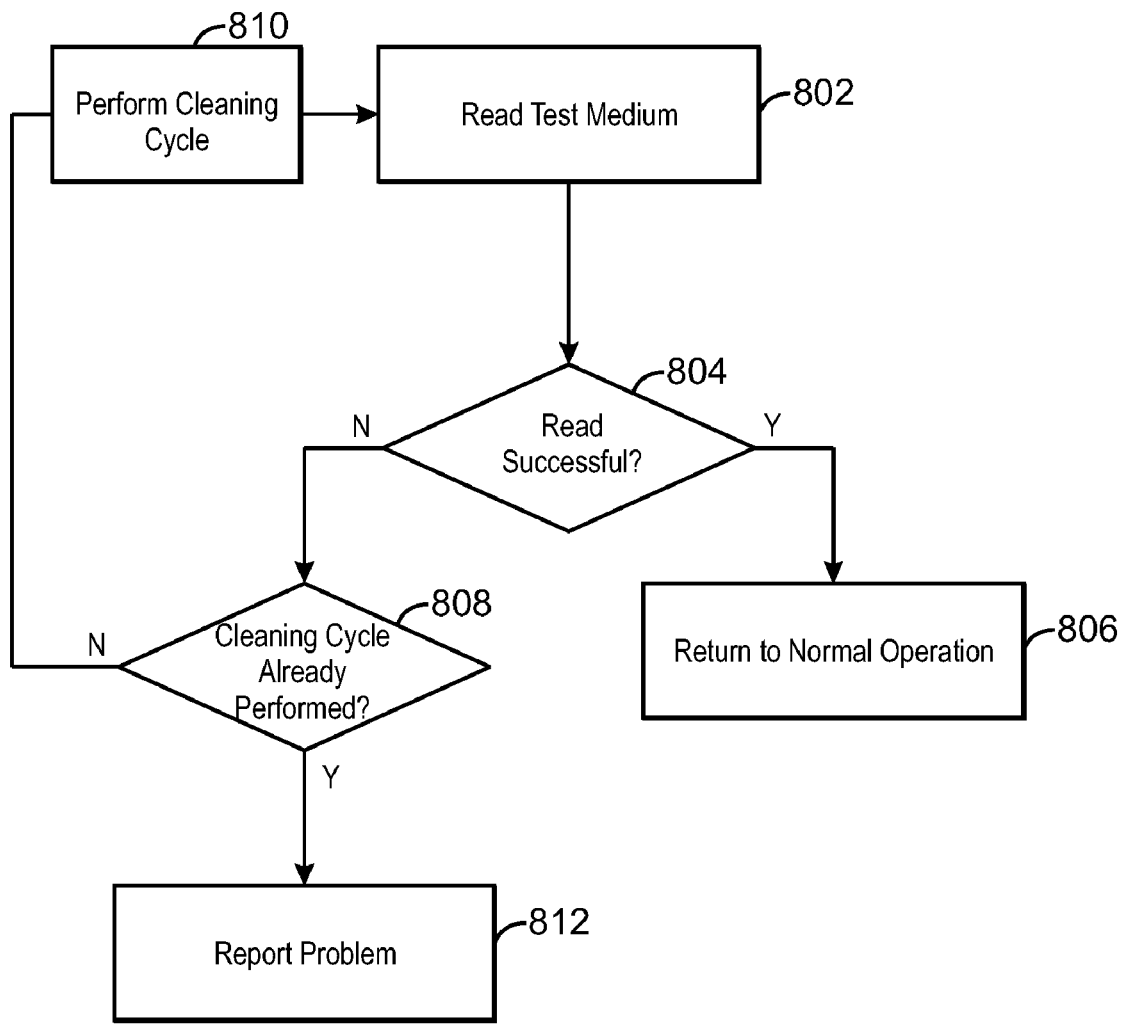
FIG. 8 is a block diagram of a method for using an embedded test medium to test reading by an optical head, in accordance with an embodiment.

FIG. 8 is a block diagram of a method 800 for using an embedded test medium to test reading by an optical head, in accordance with an embodiment. The method 800 begins at block 802 when an optical drive attempts to read at least one bit from an embedded test medium. This may be performed at some standard point in time, such as at startup, or may be performed when a problem is identified. Further, the test sequence may be manually activated by a user. At block 804, a determination as to whether the read was successful. If so, at block 806 the optical drive can return to normal operation. If the read was not successful at block 804, flow proceeds to block 808. In embodiments which use a cleaning cycle, at block 808, a determination may be made as to whether an automated cleaning cycle has already been performed. If not, at block 810 the optical drive may perform an automated cleaning cycle, as described with respect to FIG. 7. After performing the automated cleaning cycle, process flow may return to block 802 to repeat the test. Embodiments are not limited to performing an automated cleaning cycle, as the optical drive may merely alert a user to a problem, for example, proceeding from block 804 directly to block 812.

At block 808, if a cleaning cycle has already been performed, process flow may proceed to block 812 to report a problem to a user. In an embodiment, the user may be given the choice to proceed with a warning about the potentially degraded performance of the optical drive.

Figure 9:
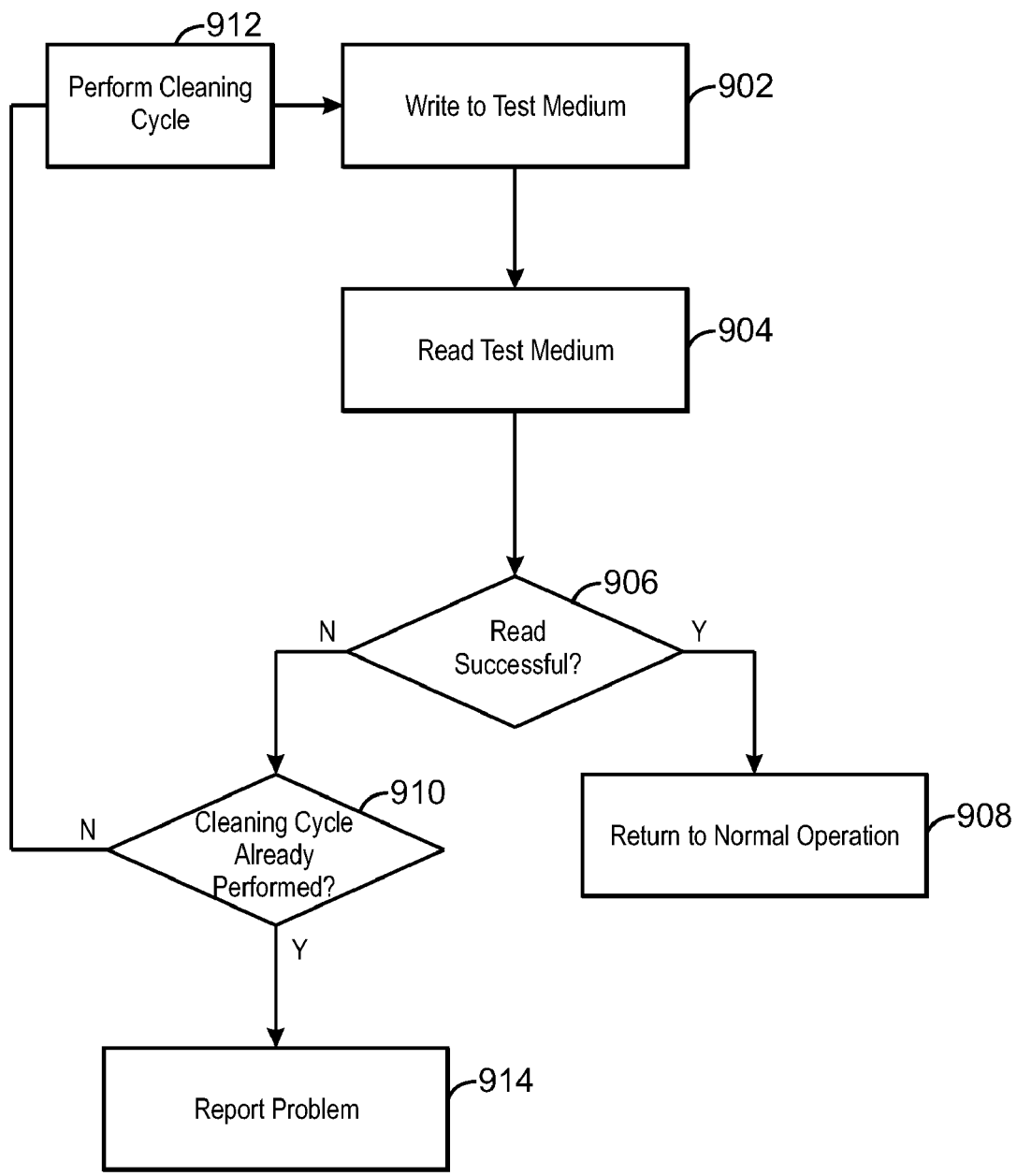
FIG. 9 is a block diagram of a method for using an embedded test medium to test writing and reading by an optical head, in accordance with an embodiment.

FIG. 9 is a block diagram of a method 900 for using an embedded test medium to test writing and reading by an optical head, in accordance with an embodiment. The method 900 begins at block 902 when the optical drive writes at least one bit to an embedded test medium. As for the read-test method 800, the write-test method 900 may be performed at a standard point, such as after a selected time interval has passed, or the write-test method 900 may be performed when problems are detected. At block 904, the optical drive attempts to read the bits written to the embedded test medium. At block 906, a determination is made as to whether the read was successful. If so, process flow proceeds to block 908, where the drive returns to normal operations. If the read was not successful, at block 910 a determination may be made as to whether a cleaning cycle has already been performed. If a cleaning cycle has not been performed, at block 912 an automated cleaning cycle may be performed, for example, as described with respect to FIG. 7. Process flow may then return to block 902 to repeat the write test. If a cleaning cycle has already been performed, then process flow may proceed to block 914, where a user may be informed of the read error. In an embodiment, the user may be given the option to proceed with a warning about the potential degradation in write/read performance.

What is claimed is:

1. An optical disk drive, comprising an embedded test medium for testing the optical performance of an optical head in the optical disk drive.

2. The optical disk drive of claim 1, wherein the embedded test medium comprises a plurality of grooves in a test zone.

3. The optical disk drive of claim 1, wherein the embedded test medium comprises a plurality of bits configured to be read by the optical head.

4. The optical disk drive of claim 1, wherein the embedded test medium comprises a writeable medium.

5. The optical disk drive of claim 1, wherein the embedded test medium comprises zones configured to be read at different wavelengths of light.

6. The optical disk drive of claim 1, comprising:
a processor; and
a storage system comprising a plurality of code modules configured to direct the processor to control operations within the optical disk drive.

7. The optical disk drive of claim 6, wherein a code module comprises code configured to direct the processor to test the optical performance of an optical head in the optical disk drive.

8. The optical disk drive of claim 6, wherein a code module comprises code configured to direct the processor to actuate a stepper motor associated with the optical head so as to vibrate the optical head.

9. The optical disk drive of claim 1, comprising an optical drive configured to provide a signal directly to a display device.

10. A computer system, comprising an optical disk drive, wherein the optical disk drive comprises an embedded test medium for testing the optical performance of an optical head in the optical disk drive.

11. The computer system of claim 10, comprising an external optical disk drive.

12. The computer system of claim 10, comprising an internal optical disk drive.

13. The computer system of claim 10, wherein the embedded test medium comprises a plurality of zones configured to test read performance at different wavelengths of light.

14. The computer system of claim 12, wherein the embedded test medium comprises at least one zone formed from a writeable material.

15. A method for testing an optical disk drive, comprising:
moving an optical head over an embedded test medium in the optical disk drive;
attempting to read at least one bit from the embedded test medium;
determining if the read was successful; and, if the read was successful,
returning the optical disk drive to normal operation.

16. The method of claim 15, comprising, if the read was not successful, generating an alert.

17. The method of claim 15, comprising, if the read was not successful, performing an automated cleaning cycle.

18. The method of claim 17, wherein the automated cleaning cycle comprises vibrating an optical head in the optical disk drive.

19. The method of claim 17, comprising, after the cleaning cycle:
moving an optical head over an embedded test medium in the optical disk drive;
reading at least one bit from the embedded test medium;
determining if the read was successful; and, if the read was successful,
returning the optical disk drive to normal operation.

20. The method of claim 15, comprising writing the least one bit to the embedded test medium prior to attempting to read the at least one bit from the embedded test medium.

* * * * *

UNITED STATES PATENT AND TRADEMARK OFFICE
CERTIFICATE OF CORRECTION

| | | |
|---|---|---|
| PATENT NO. | : 8,184,512 B2 | Page 1 of 1 |
| APPLICATION NO. | : 12/903817 | |
| DATED | : May 22, 2012 | |
| INVENTOR(S) | : Eric Gagneraud et al. | |

It is certified that error appears in the above-identified patent and that said Letters Patent is hereby corrected as shown below:

In column 6, line 62, in Claim 20, delete "least" and insert -- at least --, therefor.

Signed and Sealed this
Eleventh Day of December, 2012

David J. Kappos
*Director of the United States Patent and Trademark Office*